United States Patent
Soryal et al.

(10) Patent No.: US 10,810,185 B2
(45) Date of Patent: Oct. 20, 2020

(54) TEMPORARY SHARED STORAGE

(71) Applicant: AT&T INTELLECTUAL PROPERTY I, L.P., Atlanta, GA (US)

(72) Inventors: Joseph Soryal, Ridgewood, NY (US); Tony L. Hansen, South Amboy, NJ (US); Naila Jaoude, Eatontown, NJ (US); Lalita Rao, Holmdel, NJ (US); Cristina Serban, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 191 days.

(21) Appl. No.: 15/273,145

(22) Filed: Sep. 22, 2016

(65) Prior Publication Data
US 2018/0081927 A1 Mar. 22, 2018

(51) Int. Cl.
*H04L 29/06* (2006.01)
*H04L 29/08* (2006.01)
(Continued)

(52) U.S. Cl.
CPC ...... *G06F 16/2365* (2019.01); *H04L 63/0846* (2013.01); *H04L 63/107* (2013.01);
(Continued)

(58) Field of Classification Search
CPC .......... G06F 17/30371; H04L 63/0846; H04L 67/1097; H04L 69/28; H04W 4/02
See application file for complete search history.

(56) References Cited

U.S. PATENT DOCUMENTS

| 7,444,390 B2 | 10/2008 | Tadayon et al. |
| 7,970,418 B2 | 6/2011 | Morrison et al. |

(Continued)

FOREIGN PATENT DOCUMENTS

| EP | 2663931 A2 | 11/2013 |
| KR | 20140058618 A | 5/2014 |

(Continued)

OTHER PUBLICATIONS

"Cluster: Private group sharing with friends and family", Cluster, cluster.co, Aug. 2016.
(Continued)

*Primary Examiner* — Jahangir Kabir
(74) *Attorney, Agent, or Firm* — Guntin & Gust, PLC; Atanu Das

(57) ABSTRACT

Aspects of the subject disclosure may include, for example, a method for providing temporary shared cloud-based storage, where access to the shared storage is time-limited, location-limited and anonymous. The method includes receiving a request for storage accessible to a plurality of user devices. A storage account is initiated in response to the request; a password and a time period are associated with the storage account. User devices obtain access to the storage account using only the password provided and without users' personal credentials; access is also according to location within a geographic area defined in the request. Any of the data items is available to each user device having access to the storage account. Upon expiration of the time period, the storage account is disabled and the data items are deleted. Other embodiments are disclosed.

20 Claims, 10 Drawing Sheets

(51) Int. Cl.
*H04W 4/02* (2018.01)
*G06F 16/23* (2019.01)
*H04W 4/029* (2018.01)

(52) U.S. Cl.
CPC .......... *H04L 67/10* (2013.01); *H04L 67/1097* (2013.01); *H04L 67/28* (2013.01); *H04L 69/28* (2013.01); *H04W 4/029* (2018.02)

(56) References Cited

U.S. PATENT DOCUMENTS

| | | | | |
|---|---|---|---|---|
| 8,358,638 | B2 * | 1/2013 | Scherzer | H04W 84/18 |
| | | | | 370/338 |
| 8,489,657 | B2 | 7/2013 | Shepherd et al. | |
| 9,088,557 | B2 | 7/2015 | Aoyagi et al. | |
| 9,098,720 | B2 | 8/2015 | Bosworth et al. | |
| 9,129,125 | B2 | 9/2015 | Wang et al. | |
| 9,253,130 | B2 | 2/2016 | Zaveri | |
| 9,262,643 | B2 | 2/2016 | Srour et al. | |
| 9,544,721 | B2 * | 1/2017 | Jouaux | H04W 4/029 |
| 9,747,057 | B1 * | 8/2017 | Ramani | G06F 3/0652 |
| 10,356,164 | B2 * | 7/2019 | Botea | H04W 4/021 |
| 10,586,252 | B2 * | 3/2020 | Jeon | H04L 67/02 |
| 10,587,711 | B2 * | 3/2020 | Fan | H04L 67/26 |
| 2002/0186402 | A1 * | 12/2002 | Jackson | H04N 1/00132 |
| | | | | 358/1.15 |
| 2006/0129627 | A1 * | 6/2006 | Phillips | H04L 63/10 |
| | | | | 709/200 |
| 2009/0144183 | A1 * | 6/2009 | Gatchell | G06Q 10/06 |
| | | | | 705/34 |
| 2009/0249335 | A1 | 10/2009 | Vasilevsky et al. | |
| 2011/0131335 | A1 | 6/2011 | Spaltro et al. | |
| 2013/0132477 | A1 * | 5/2013 | Bosworth | G06Q 50/01 |
| | | | | 709/204 |
| 2013/0218845 | A1 | 8/2013 | Kleppner et al. | |
| 2013/0332179 | A1 | 12/2013 | Girard et al. | |
| 2014/0258405 | A1 * | 9/2014 | Perkin | H04W 4/021 |
| | | | | 709/204 |
| 2015/0012639 | A1 | 1/2015 | McClean | |
| 2015/0249709 | A1 | 9/2015 | Teng et al. | |
| 2015/0249710 | A1 | 9/2015 | Stefansson et al. | |
| 2015/0339464 | A1 * | 11/2015 | Kode | H04L 63/102 |
| | | | | 726/18 |
| 2016/0063272 | A1 | 3/2016 | Sharma et al. | |
| 2016/0142382 | A1 | 5/2016 | Ziebell | |
| 2016/0234267 | A1 * | 8/2016 | Hebbar | H04L 65/403 |
| 2016/0323262 | A1 * | 11/2016 | Tan | G06F 21/10 |
| 2016/0358144 | A1 * | 12/2016 | Thrope | G01C 21/00 |
| 2017/0005999 | A1 * | 1/2017 | Choyi | H04L 63/0435 |
| 2017/0111410 | A1 * | 4/2017 | DeLuca | H04L 67/18 |
| 2017/0195335 | A1 * | 7/2017 | Kurian | H04L 63/102 |

FOREIGN PATENT DOCUMENTS

| | | |
|---|---|---|
| WO | 2013124850 A1 | 8/2013 |
| WO | 2013168512 A1 | 11/2013 |
| WO | 2014031201 A2 | 2/2014 |

OTHER PUBLICATIONS

"File Town", File.Town, Aug. 2016.
"Receive files in your Dropbox/GoogleDrive/Box.com/FacebookAlbum/S3Bucket/PersonalCloud", Cloud Wok, cloudwok.com, Aug. 2016.
Sawers, Paul, "7 of the best photo sharing apps to help everyone collaborate, gather and share photos from events", TNW, thenextweb.com, Aug. 13, 2013.

* cited by examiner

200

400

600

900

1000

TEMPORARY SHARED STORAGE

FIELD OF THE DISCLOSURE

The subject disclosure relates to temporary shared storage, and more particularly to cloud-based storage shared among mobile device users who are not acquainted with each other.

BACKGROUND

Users of mobile communication devices often want to share information with each other. In some situations it is desirable to share information anonymously and/or with a restricted group of users, and for only a limited period of time.

BRIEF DESCRIPTION OF THE DRAWINGS

Reference will now be made to the accompanying drawings, which are not necessarily drawn to scale, and wherein.

DETAILED DESCRIPTION

Figure 1:
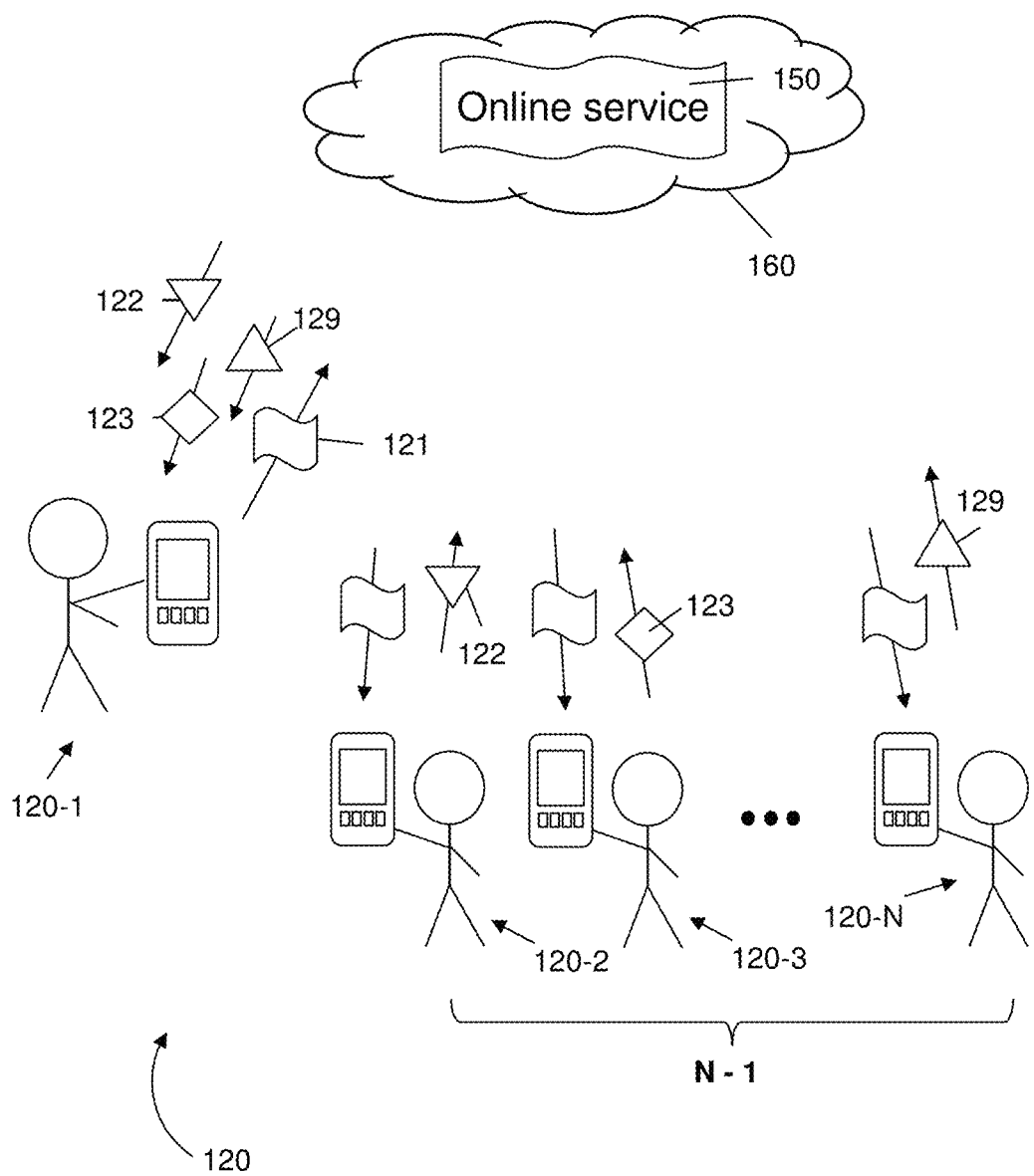
FIG. 1 schematically illustrates a group of mobile device users sharing data items while logged in to an online service.

The subject disclosure describes, among other things, illustrative embodiments for providing temporary shared cloud-based storage, where access to the shared storage is time-limited, location-limited and anonymous. Other embodiments are described in the subject disclosure.

One or more aspects of the subject disclosure include a method comprising receiving, by a processing system including a processor, a request for storage accessible to a plurality of user devices; wherein a plurality of device users associated with the plurality of user devices subscribe to a service provided by the processing system, and each of the plurality of device users has a personal credential for accessing the service. The method also comprises initiating a storage account in response to the request; a name, a password and a time period are associated with the storage account. The method further comprises storing data items transmitted by user devices having access to the storage account without using the personal credential, by using the password and according to location within a geographic area defined in the request; any of the data items is available to each of the plurality of user devices having access to the storage account. The request is received from a requester device of the plurality of user devices; the geographic area is based on a location of the requester device. The method also comprises, upon expiration of the time period, disabling the storage account and deleting the data items.

One or more aspects of the subject disclosure include a device comprising a processing system including a processor and a memory that stores executable instructions that, when executed by the processing system, facilitate performance of operations. The operations comprise receiving a request for storage accessible to a plurality of user devices; a plurality of device users associated with the plurality of user devices subscribe to a service provided by the processing system, and each of the plurality of device users has a personal credential for accessing the service. The operations also comprise initiating, in response to the request, a storage account having associated therewith a name, a password and a time period, and storing data items transmitted by user devices having access to the storage account without the personal credential, by using the password and according to location within a geographic area defined in the request; any of the data items is available to each of the plurality of user devices having access to the storage account. The request is received from a requester device of the plurality of user devices, and the geographic area is based on a location of the requester device. The operations further comprise, upon expiration of the time period, disabling the storage account and deleting the data items, the name associated with the storage account, and the password associated with the storage account.

One or more aspects of the subject disclosure include a machine-readable storage medium comprising executable instructions that, when executed by a processing system including a processor, facilitate performance of operations. The operations comprise receiving a request for storage accessible to a plurality of user devices; a plurality of device users associated with the plurality of user devices subscribe to a service provided by the processing system, and each of the plurality of device users has a personal credential for accessing the service. The operations also comprise initiating, in response to the request, a storage account having associated therewith a name, a password and a time period. The operations further comprise storing data items transmitted by user devices having access to the storage account without the personal credential, by using the password and according to location within a geographic area defined in the request; any of the data items is available to each of the plurality of user devices having access to the storage account. The request is received from a requester device of the plurality of user devices, and the geographic area is based on a location of the requester device. The operations also comprise disabling the storage account and deleting the data items upon expiration of the time period. A single message comprising all of the stored data items is transmitted to one of the plurality of user devices responsive to a command from that user device.

FIG. 1 depicts a gathering of mobile device users 120 at an event 100 whose devices communicate with an online service 150 via a network (schematically illustrated as cloud 160). In the example of FIG. 1, there are N users 120-1, 120-2, 120-3, ... 120-N who are within a limited physical distance from each other, but may or may not be known to each other. For example, the mobile device users may be at a social gathering, or attending a major public event.

As shown in FIG. 1, each user has a data item (a picture, text message, etc.) they wish to share with the others; for example, user 120-1 uploads data item 121 and downloads items 122, 123, 129 from storage location(s) in cloud 160. In order to share all data items, users 120 must perform a total number of N*(N−1) upload/download transactions. (For the sake of clarity, not all transactions involving data items 121, 122, 123, 129 are shown in FIG. 1.)

Figure 2:
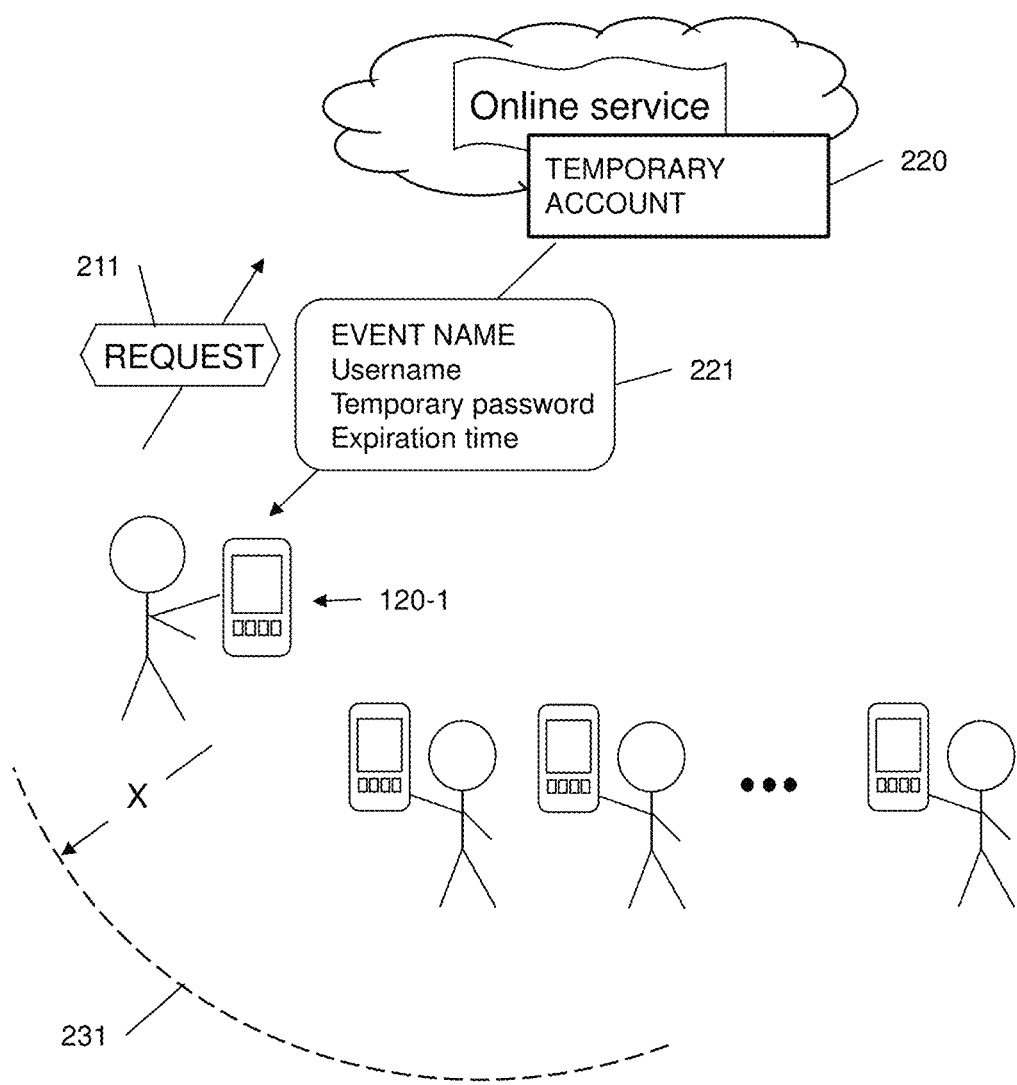
FIG. 2 schematically illustrates creation of a temporary shared storage account using the online service, in accordance with an embodiment of the disclosure.

FIG. 2 schematically illustrates creation of a temporary storage account for use at an event 200, in accordance with an embodiment of the disclosure. One of the mobile device users 120 (in this example, user 120-1) transmits a message 211 to the online service, requesting that a temporary storage account 220 be created. In an embodiment, the temporary storage is provided by the requesting user invoking an application offered by the online service. The service responds by creating the account and associating information including identifiers to the account; in this embodiment, the account is associated with an event name, a username, a password, and an expiration time. This information is transmitted in a message 221 to the requesting user 120-1. All the information in message 221 is temporary; none is retained after the expiration time.

The event name may be specified by the requesting user when transmitting the request. In another embodiment, the event name is generated by the online service from a calendar maintained by the requesting user. The online service may also attach a username (associated with the requesting user) to the account 220, to distinguish that account from other accounts being created at the same event. The online service provides a password for accessing the temporary account 220; in an embodiment, the password can be specified by user 120-1 in the request. Message 221 also specifies the expiration time for the temporary storage; that is, a time after which no access to the storage is permitted. The expiration time (which can be expressed as a storage period or a lifetime for the storage account, e.g. six hours, three days, etc.) can depend on a level of service subscribed to by the requesting user, or can be specified in the request.

In an embodiment, the requesting user can include in the request a distance X, so that only users within a boundary 231 at a distance X from the requester are permitted to access the temporary storage. Boundary 231 can thus be fixed at the time the request is transmitted. In another embodiment, the online service updates the location of the requester during the lifetime of the account, so that the boundary moves as the requester changes his location. In another embodiment, the requester can specify the name of the venue of event 200 (or the online service can infer the venue name from the requester's current location), so that boundary 231 is defined by the physical limits of the venue.

In this embodiment, the online service provides information regarding creation of the temporary storage account 220 only to the requesting user; in particular, only the requesting user receives message 221 with the password for accessing the temporary storage. However, all users 120 (that is, all subscribers logged in to service 150 and located within boundary 231), after learning the temporary password, can access storage account 220 by providing only the temporary password, without having to provide their individual identifying information. Accordingly, access to the shared storage in this embodiment is time-limited, location-limited and anonymous.

Furthermore, it will be appreciated that the data uploaded to the temporary storage 320 is shared among the user devices, while the user devices do not communicate with each other. The users 120, while they may be temporarily considered a group for purposes of sharing the stored data, are in general not acquainted with each other and have no need to meet each other.

In this embodiment, the requester 120-1 provides the temporary password to the other users 120-2, . . . 120-N in an offline operation (e.g. a vocal announcement, written placard, electronic billboard, etc.). In another embodiment, the requester can transmit a preselected password to his acquaintances (e.g. by text messaging), who then can access the temporary storage account without communicating with any other user or revealing their presence at the event.

Figure 3:
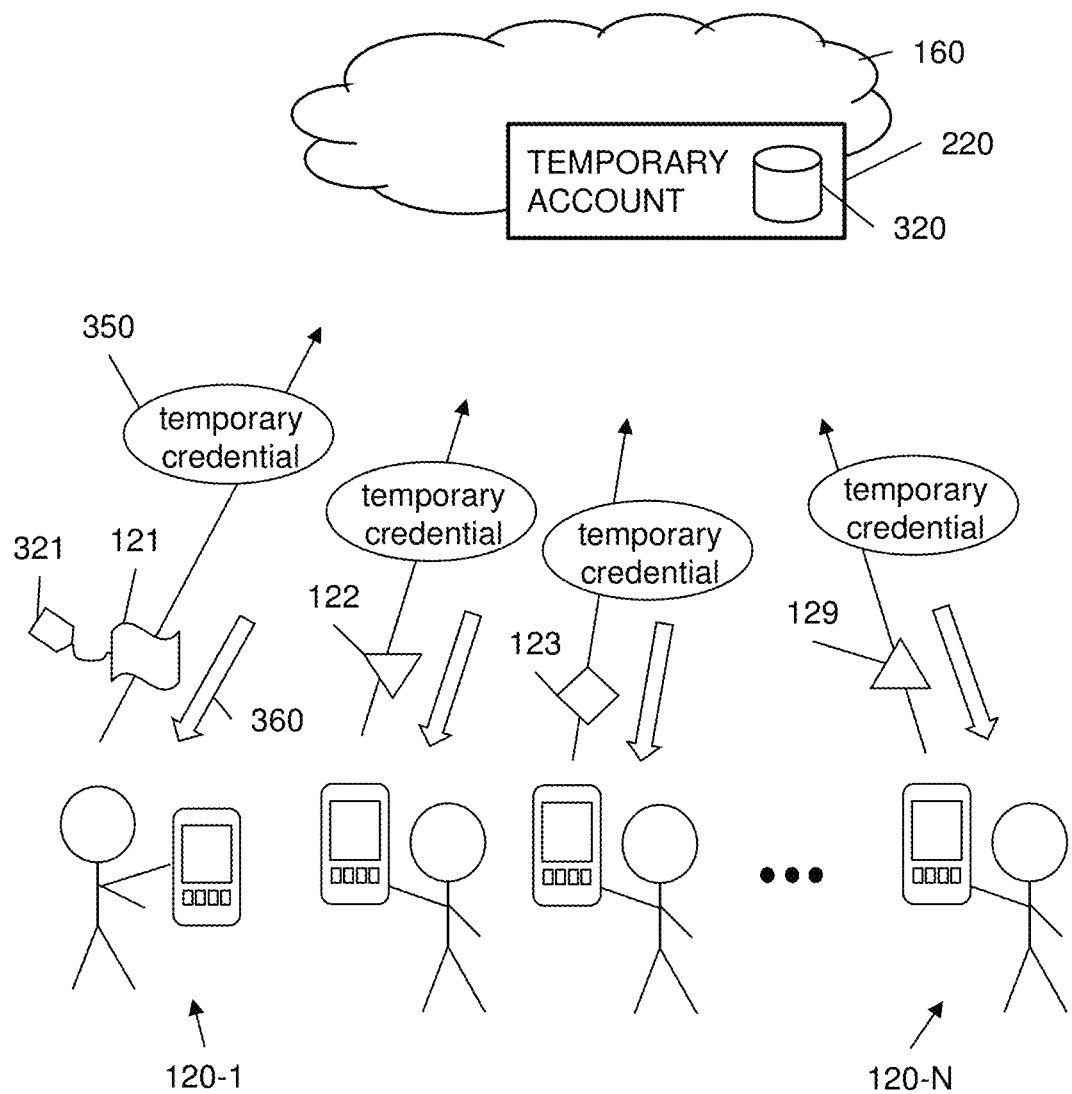
FIG. 3 schematically illustrates a group of mobile device users sharing data items stored in the temporary shared storage of FIG. 2.

FIG. 3 schematically illustrates a gathering 300 where all mobile device users 120-1, . . . 120-N share data items using temporary storage 320 via temporary account 220. In this embodiment, a user can log in to service 150, look up the event name, transmit the temporary password 350, and proceed to share data items with the other users. In this embodiment, each user can upload one or more data items (e.g. 121, 122, 123, 129); an uploaded data item (for example, data item 121 in FIG. 3) can be tagged with the user's username 321. Each user can download a selected portion of the temporarily stored data items in a single stream 360. In a particular embodiment, each of the user devices downloads all of the stored data items in a single message transmitted to that user device from the temporary shared storage. In this situation, all N users share all of the data items in 2N transactions (one upload and one download for each user), compared to the N*(N−1) transactions of FIG. 1.

In an embodiment (for example, at a business conference), the requester can specify that all items uploaded to the shared storage be tagged. A system providing the shared storage can then maintain a log of uploaded files with identifiers of the individuals submitting those files.

In an embodiment, some or all of users 120 subscribe to a social network connected to cloud 160 via a gateway. A user having access to the temporary storage 320 can then upload the contents of the temporary storage to the social network.

In another embodiment, the requesting user (e.g. an organizer of a conference) can assemble a file of data items and upload the file when the temporary storage account is created. Alternatively, the file can be attached to the request 211. The organizer can then announce the temporary password at the conference; each participant then can download the data items without having to provide identification or addresses to the other participants. In this embodiment, the organizer may wish to create the temporary storage only to distribute the file; accordingly, the temporary account can be accessed by the conference participants for downloading the file but not for uploading. More generally, different expiration times for uploading and downloading data items can be specified in the request 211.

Figure 4:
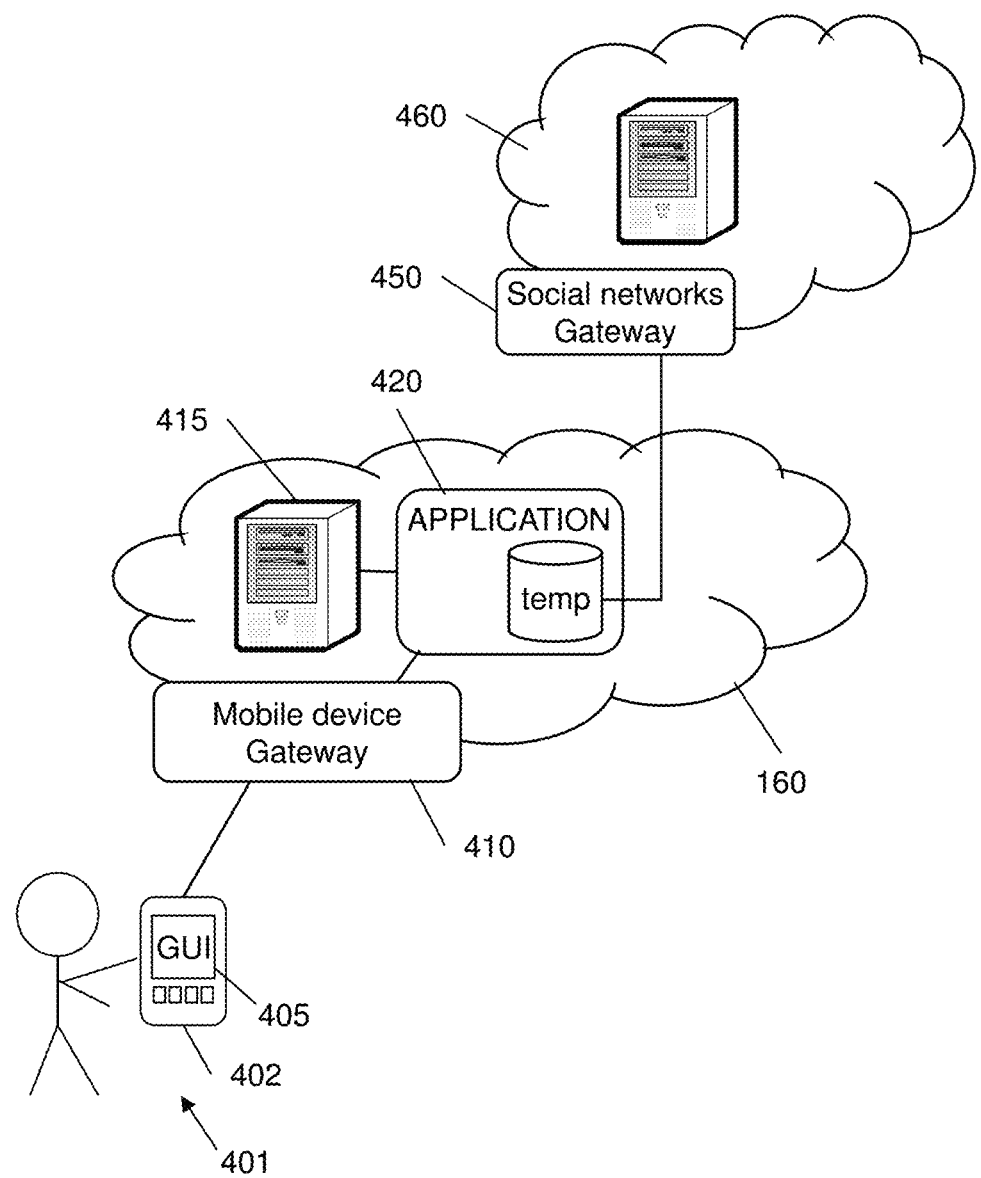
FIG. 4 schematically illustrates a system for providing cloud-based temporary shared storage to a mobile device.

FIG. 4 schematically illustrates a system 400 for providing temporary shared storage in accordance with embodiments of the disclosure. Mobile device 402, associated with user 401, is connected to online services in cloud 160 via mobile device gateway 410. Device 402 can transmit and receive information via an interface (e.g. graphical user interface or GUI) 405. In this embodiment, application 420 residing on application server 415 is downloaded to device 402; when user 402 provides the temporary password via GUI 405, the application grants access to the temporary cloud-based storage. In an embodiment, contents of the temporary storage can be uploaded via a social networks gateway 450 and distributed on social network 460.

Figure 5:
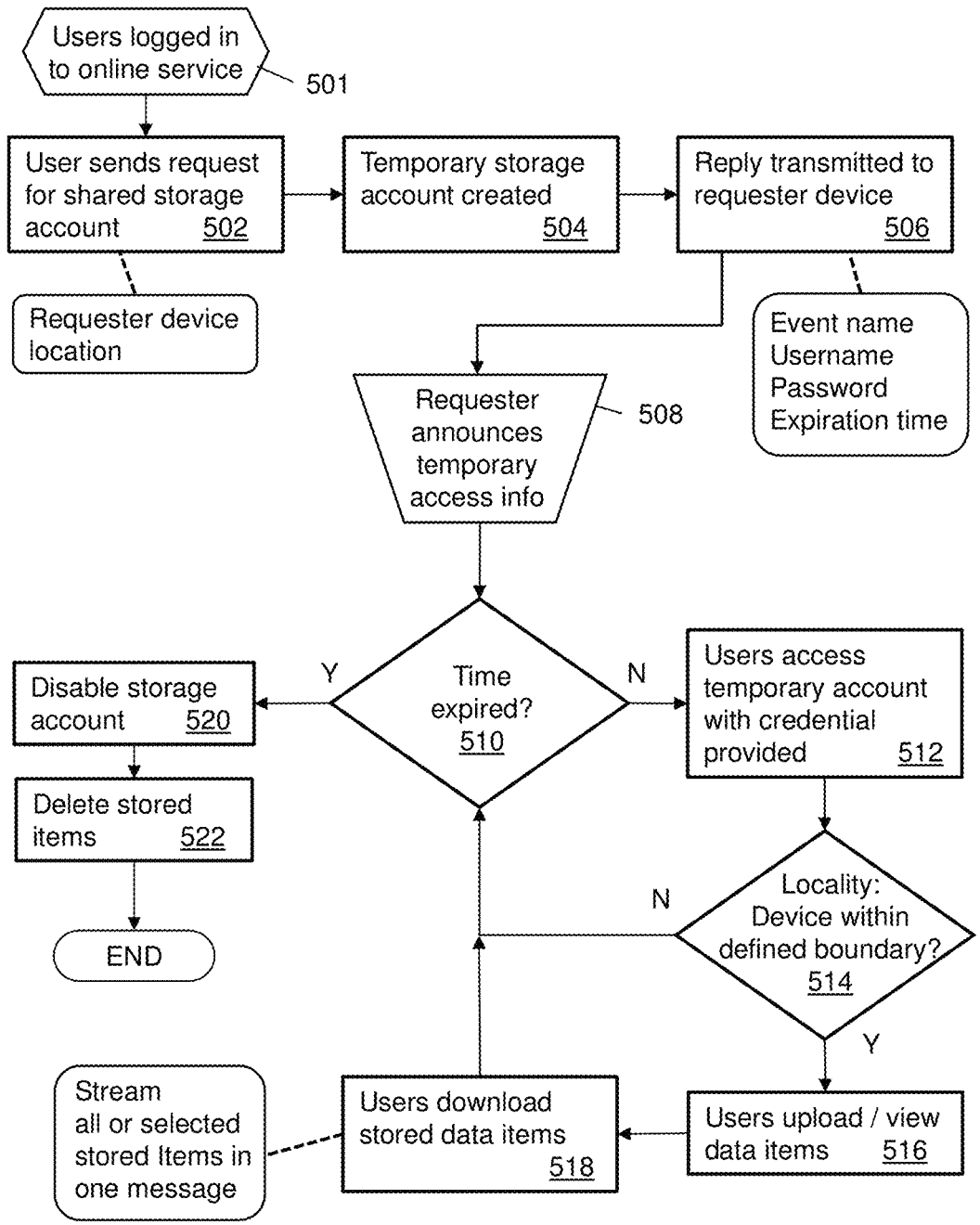
FIG. 5 is a flowchart illustrating a method in which cloud-based temporary shared storage is created and accessed, in accordance with embodiments of the disclosure.

FIG. 5 depicts an illustrative embodiment of a method 500 for creating and using temporary shared storage. In this method, a number of users are logged in 501 to an online service. A user (requester) associated with a requesting device sends a request for a shared storage account to the online service (step 502); in an embodiment, the request includes the location of the device (e.g. address, name of venue). The temporary storage account is created (step 504) and a reply is transmitted to the requester device (step 506). In this embodiment, the reply includes an event name, a username, a password and an expiration time for the temporary storage.

In step 508, the requester announces information to other users so that they can access the temporary shared storage; the announcement includes the temporary password, which in general is different from the passwords used to log in to the online service. In this embodiment, step 508 is performed as an offline operation, so that the requestor's device does not need to communicate with any other user device.

During the lifetime of the temporary shared storage (step 510), access to the temporary storage account is available with the temporary password (step 512). In this embodiment, the online service enforces locality (step 514) by determining whether a user device is located within the defined boundary 231; access by devices outside the boundary is denied. Users accessing the temporary shared storage can upload and view data items with their devices (step 516), and can download stored data items (step 518). In an embodiment, a user can view the stored data items and select items for download. In another embodiment, a download to a user device includes all of the stored data items, streamed in a single message.

If the expiration time has passed (step 510), the storage account is permanently disabled (step 520) and all of the stored items are deleted (step 522).

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It will be appreciated that temporary shared cloud-based storage according to various embodiments of the disclosure, examples of which are described herein, can be used in mobile communications including, but not limited to, fourth generation long term evolution (4G LTE) communications described in whole or in part by standards bodies such as Third Generation Partnership Project (3GPP). Embodiments of the disclosure may also be applicable to technologies evolving from 4G LTE, such as LTE Advanced (3GPP Release 10), LTE Advanced Pro (3GPP Release 13), and fifth generation radio access networks (5G RAN).

Figure 6:
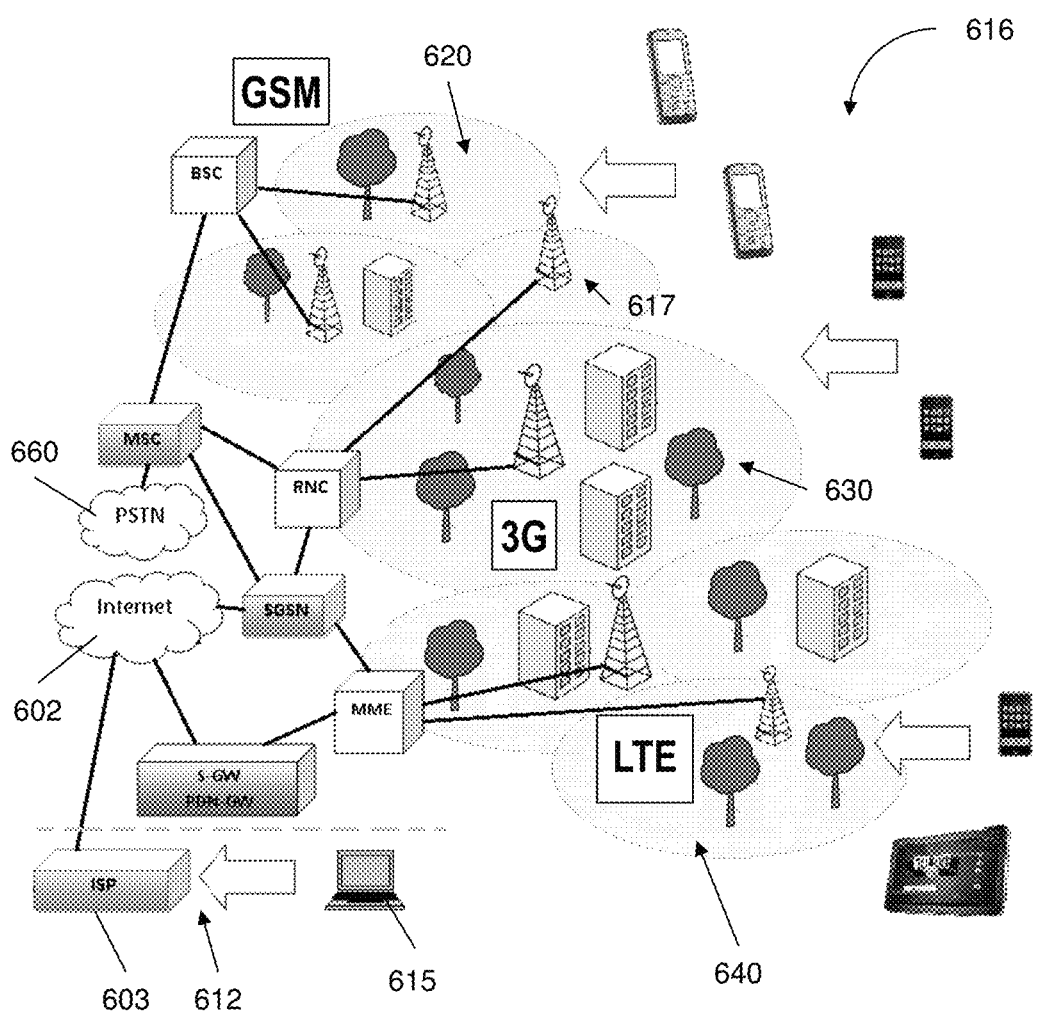
FIGS. 6-8 depict illustrative embodiments of systems that provide communications services to the devices of FIGS. 1-4.

FIG. 6 depicts an illustrative embodiment of an architecture 600 for a network for interacting with mobile communication devices. According to an embodiment of the disclosure, a mobile device 616 (which may correspond to a UE 110) can connect with one or more of the networks shown in FIG. 6 using a personal credential and a mobile device gateway. Mobile devices 616 may represent a variety of technologies (phones, tablets, etc.) and may have an end-to-end connection established with either the Public Switched Telephone Network (PSTN) 660, in the case of voice traffic, or an internet protocol network (Internet) 602, in the case of data traffic. The architecture can include a Global System for Mobile (GSM) network 620, a 3G network 630, and/or a Long Term Evolution (LTE) network 640. In particular, LTE specifications define an all-internet protocol architecture with voice over internet protocol (VoIP).

FIG. 6 also illustrates a device 615 accessing the network through a broadband connection 612 to an Internet Service Provider (ISP) 603. Any of devices 615-616 can include a processing system including a processor and a memory that stores executable instructions that, when executed by the processing system, facilitate performance of operations. The operations can comprise receiving a request for storage accessible to a plurality of user devices; a plurality of device users associated with the plurality of user devices subscribe to a service provided by the processing system, and each of the plurality of device users has a personal credential for accessing the service. In response to the request, a storage account is initiated, having associated therewith a name, a password and a time period, and storing data items transmitted by user devices having access to the storage account without the personal credential, by using the password and according to location within a geographic area defined in the request; any of the data items is available to each of the plurality of user devices having access to the storage account. The request is received from a requester device of the plurality of user devices, and the geographic area is based on a location of the requester device. The operations further comprise, upon expiration of the time period, disabling the storage account and deleting the data items, the name associated with the storage account, and the password associated with the storage account.

Figure 7:
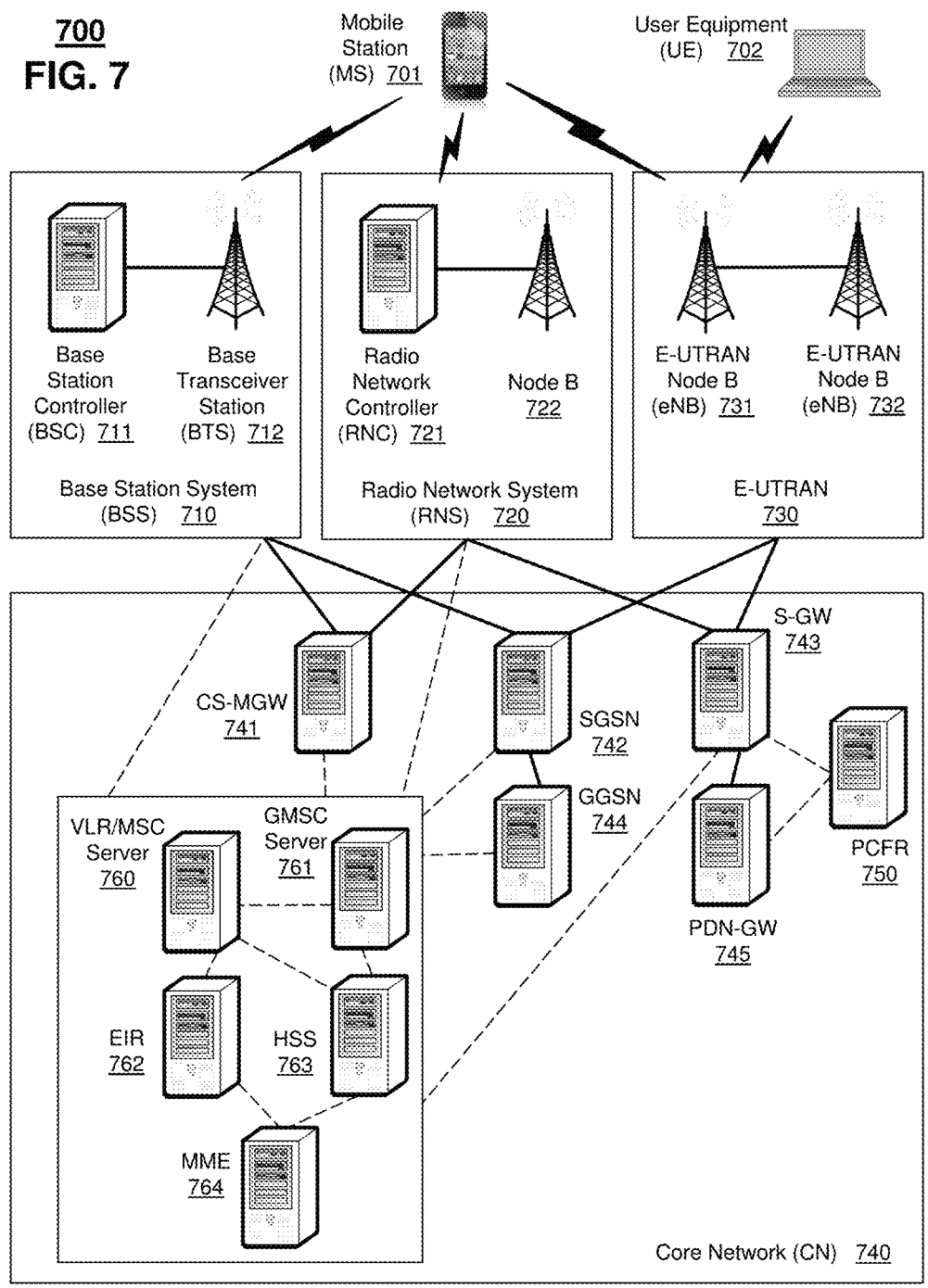

FIG. 7 schematically illustrates a communication system 700 in which one or more embodiments of the subject disclosure may be implemented. Mobile Station 701 may be one of, but not limited to, a cellular telephone, a cellular telephone in combination with another electronic device or any other wireless mobile communication device. According to an embodiment of the disclosure, Mobile Station 701 and/or User Equipment 702 can communicate wirelessly with one or more of the systems shown in FIG. 7.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. BSS 710 can perform functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 can perform functions such as, but not limited to, load control, packet scheduling, handover control, security functions, as well as controlling access by Mobile Station 701 access to the Core Network (CN).

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks; later releases meet the requirements of the International Mobile Telecommunications (IMT) Advanced and are commonly known as a 4G networks. E-UTRAN 730 may include a series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Mobile Station 701 may communicate with any or all of BSS 710, RNS 720, or E-UTRAN 730. In an illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 741 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information; HSS 763 can store subscription data regarding Mobile Station 701 or User Equipment 702 for handling calls or data sessions. Networks may contain one HSS 763, or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 can provide user location functionality. In an embodiment, when Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

Figure 8:
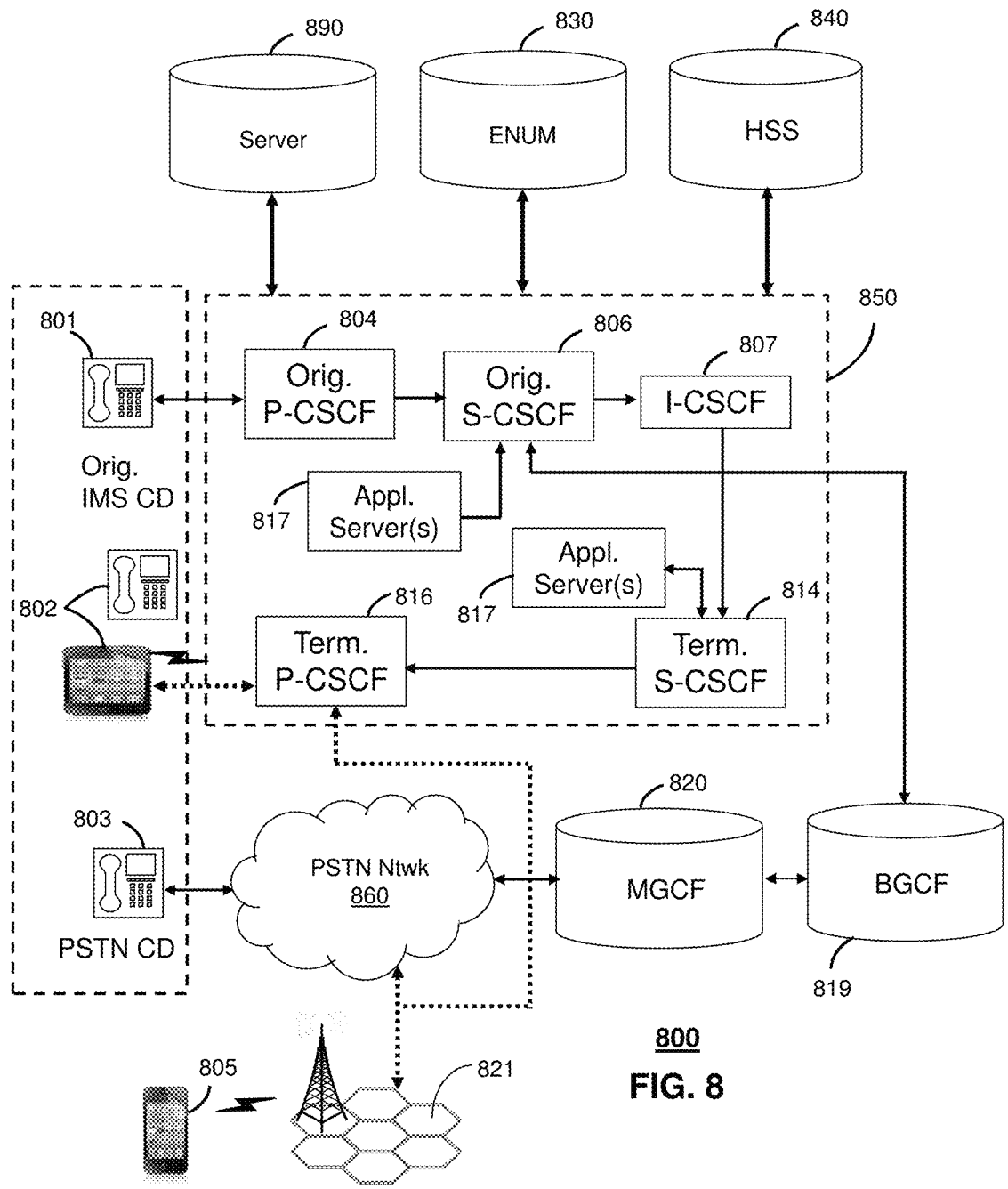

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with systems 400, 600 and/or 700 as another representative embodiment. In particular, system 800 when operably coupled with systems 400, 600 and/or 700 can facilitate performance of a method including receiving a request for storage accessible to a plurality of user devices; a plurality of device users associated with the plurality of user devices subscribe to a service provided by the processing system, and each of the plurality of device users has a personal credential for accessing the service. In response to the request, a storage account is initiated, having associated therewith a name, a password and a time period, and storing data items transmitted by user devices having access to the storage account without the personal credential, by using the password and according to location within a geographic area defined in the request; any of the data items is available to each of the plurality of user devices having access to the storage account. The request is received from a requester device of the plurality of user devices, and the geographic area is based on a location of the requester device. The operations further comprise, upon expiration of the time period, disabling the storage account and deleting the data items, the name associated with the storage account, and the password associated with the storage account.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as Third Generation Partnership Project (3GPP). It is further noted that some or all embodiments of the subject disclosure may in whole or in part modify, supplement, or otherwise supersede final or proposed standards published and promulgated by 3GPP.

Figure 9:
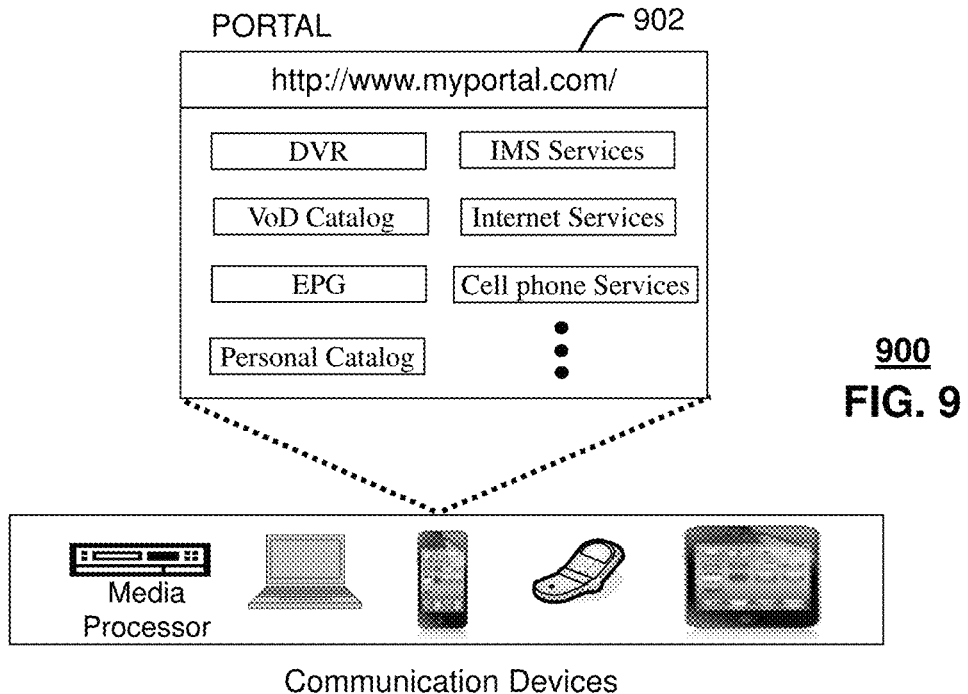
FIG. 9 depicts an illustrative embodiment of a web portal for interacting with the communication systems of FIGS. 6-8.

FIG. 9 depicts an illustrative embodiment of a web portal 902 of a communication system 900. Communication system 900 can be overlaid or operably coupled with communication system 600 and/or communication system 700 as another representative embodiment of a system for providing temporary shared storage as shown in FIGS. 2-4. The web portal 902 can be used for managing services of communication systems 600-700. A web page of the web portal 902 can be accessed by a Uniform Resource Locator (URL) with an Internet browser using an Internet-capable communication device such as those described in FIGS. 1 and 6-8. The web portal 902 can be configured, for example, to access UE 702; in an embodiment, UE 702 comprises a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor. The web portal 902 can also be used for provisioning IMS services described earlier, provisioning Internet services, provisioning cellular phone services, and so on.

The web portal 902 can further be utilized to manage and provision software applications to adapt these applications as may be desired by subscribers and/or service providers of communication systems 600-800. For instance, users of services provided over networks shown in FIGS. 6-8 can log into their on-line accounts and provision server 763 or 840 with user profiles or contact information to the server to enable communication with devices described in FIGS. 1, 6, 7 and 8, and so on. Service providers can log onto an administrator account to provision, monitor and/or maintain the systems of FIGS. 1, 6, 7 and/or 8.

Figure 10:
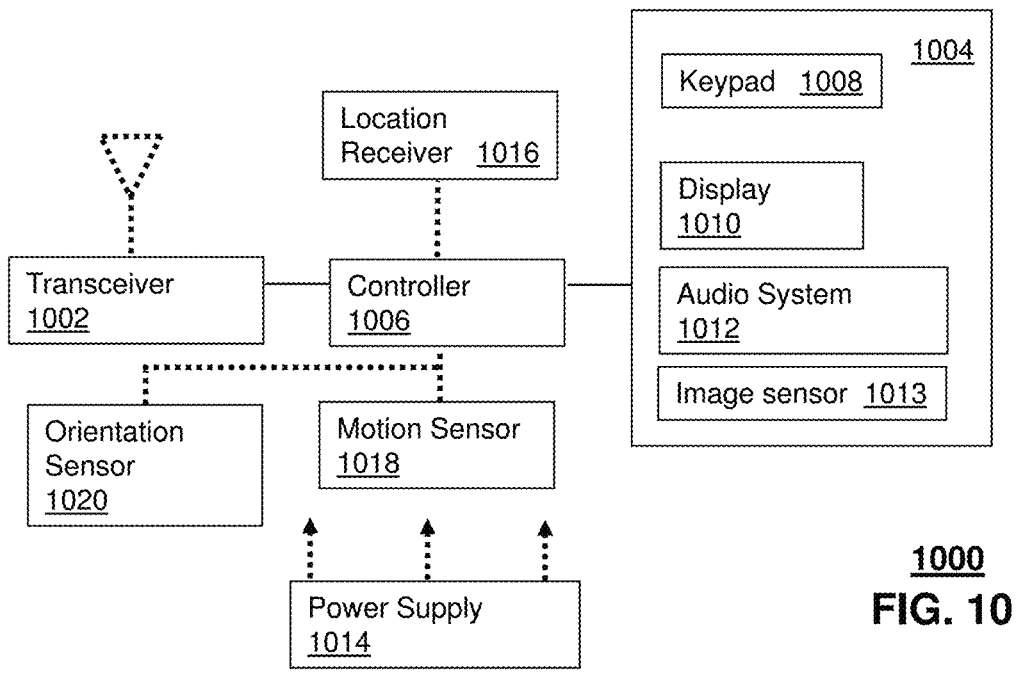
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1, 6, 7 and/or 8, and can be configured to perform portions of [method 500 of FIG. 5.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 7 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 7. These variant embodiments can be used in one or more embodiments of the subject disclosure.

The communication device 1000 can be adapted to perform the functions of UE devices of FIG. 1, the portable communication devices 616 of FIG. 6, and the mobile station 701 and UE 702 of FIG. 7, as well as the IMS CDs 801-802 and PSTN CDs 803-805 of FIG. 8. It will be appreciated that the communication device 1000 can also represent other devices that can operate in communication systems 600-800 of FIGS. 6-8'. In addition, the controller 1006 can be adapted in various embodiments for requesting creation of a shared storage account and accessing the shared storage account.

Upon reviewing the aforementioned embodiments, it would be evident to an artisan with ordinary skill in the art that said embodiments can be modified, reduced, or enhanced without departing from the scope of the claims described below. For example, a computing device including a processor can be configured to provide temporary shared storage in which advertising content is stored when the storage account is created, so that the advertising content is delivered to the user device when a download from the shared storage is performed. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
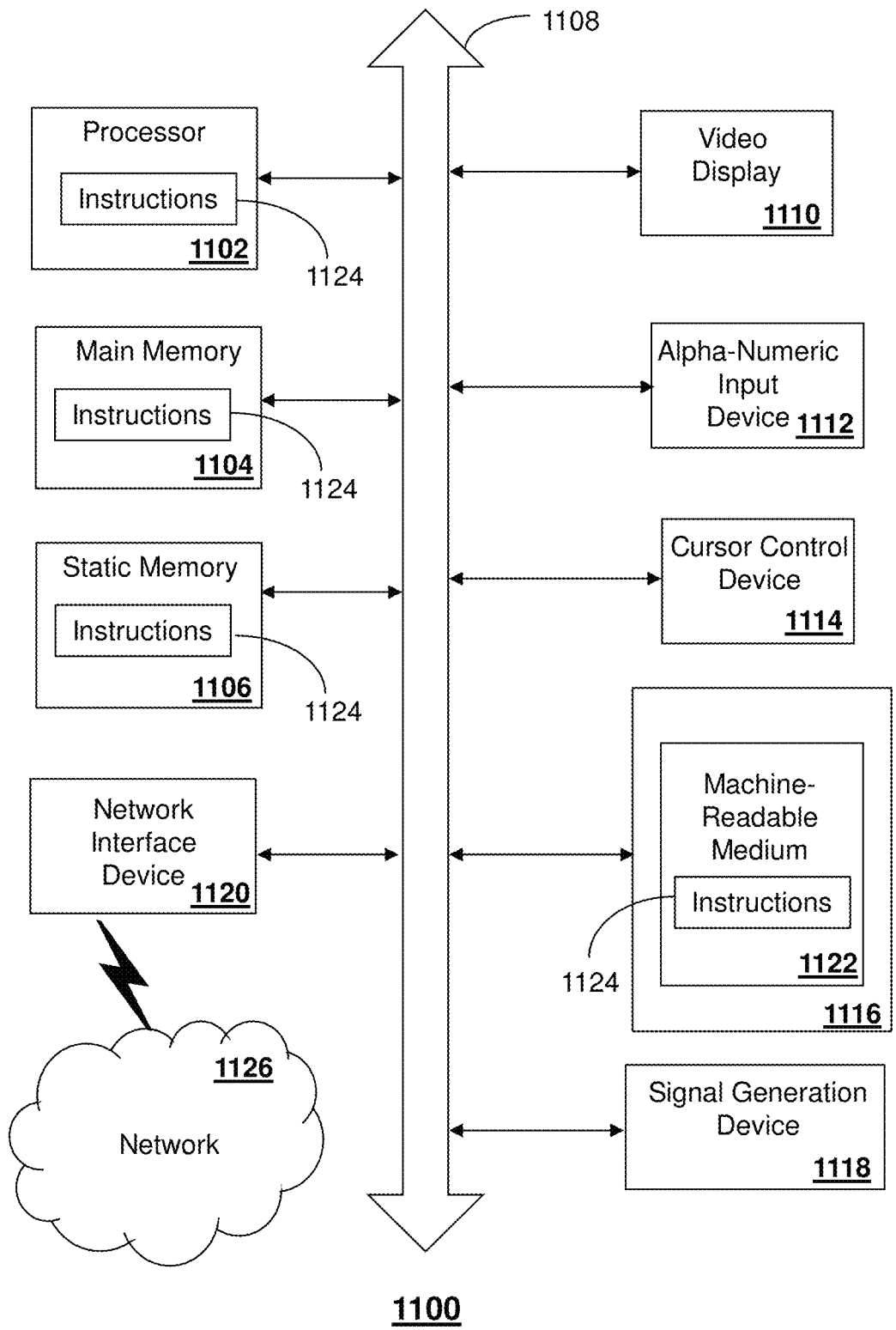
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as a processing system that receives a request for storage accessible to a plurality of user devices; initiates a shared storage account; and disables the shared storage account upon expiration of a predefined time period. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a processing system including a processor, a request for storage accessible to a plurality of user devices, wherein a plurality of device users associated with the plurality of user devices subscribe to a service provided by the processing system, each of the plurality of device users having a personal credential for accessing the service;
   initiating, by the processing system in response to the request, a storage account having associated therewith a name, a password, a predetermined uploading time period, a predetermined downloading time period that differs from the predetermined uploading time period, and a predetermined storage time period;
   storing, by the processing system, during the predetermined storage time period, data items transmitted during the predetermined uploading time period by user devices having access to the storage account without using the personal credential, wherein the plurality of user devices access the storage account by using the password, wherein the password is distinct from the personal credential, is shared by the plurality of device users, and is used only to access the storage account, wherein the plurality of user devices access the storage account only when located within a geographic area defined in the request, and wherein any of the data items is available during the predetermined downloading time period to each of the plurality of user devices having access to the storage account by using the password; and
   upon expiration of the predetermined storage time period:
      disabling, by the processing system, the storage account; and
      deleting, by the processing system, the data items and the password,
   wherein the request is received from a requester device of the plurality of user devices,
   wherein the name of the storage account corresponds to an event name,
   wherein the event name is determined according to a calendar associated with a user of the requester device or a location of the requester device,
   wherein the geographic area is based on a distance from the location of the requester device,
   wherein the geographic area is updated according to movements of the requester device thereby resulting in a dynamically updated geographic area,
   wherein the dynamically updated geographic area results in a first device of the plurality of user devices previously outside the geographic area being able to access the storage account upon transitioning into the dynamically updated geographic area, and
   wherein the dynamically updated geographic area results in a second device of the plurality of user devices previously inside the geographic area being unable to access the storage account upon transitioning out of the dynamically updated geographic area.

2. The method of claim 1, wherein the storage account is anonymously shared with the plurality of device users.

3. The method of claim 1, wherein each of the data items transmitted during the predetermined uploading time period is tagged with a corresponding username of a corresponding one of the plurality of device users.

4. The method of claim 1, wherein the event name corresponds to an identifier of a venue, and wherein the geographic area is initiated at the venue.

5. The method of claim 1, wherein a single message comprising a selected portion of the data items is transmitted to a user device of the plurality of user devices responsive to a command from the user device.

6. The method of claim 1, wherein the predetermined storage time period is specified in the request.

7. The method of claim 6, wherein the request specifies the predetermined uploading time period and the predetermined downloading time period.

8. The method of claim 1, wherein the password is specified in the request.

9. The method of claim 1, further comprising:

receiving, by the processing system, the password from the requester device; and determining, by the processing system, the location of the requester device.

10. The method of claim 1, wherein the password is announced to the plurality of device users via the requester device without utilizing the processing system.

11. A device, comprising:

a processing system including a processor; and a non-transitory machine-readable medium that stores executable instructions that, when executed by the processing system, facilitate performance of operations comprising:

receiving a request for storage accessible to a plurality of user devices, wherein a plurality of device users associated with the plurality of user devices subscribe to a service provided by the processing system, each of the plurality of device users having a personal credential for accessing the service;

initiating, in response to the request, a storage account having associated therewith a name, a password, a predetermined uploading time period, a predetermined downloading time period that differs from the predetermined uploading time period, and a predetermined storage time period;

storing, during the storage time period, data items transmitted during the predetermined uploading time period by user devices having access to the storage account without the personal credential, wherein the plurality of user devices access the storage account by using the password, wherein the password is distinct from the personal credential, is shared by the plurality of device users, and is used only to access the storage account, wherein the plurality of user devices access the storage account only when located within a geographic area defined in the request, and wherein any of the data items is available during the predetermined downloading time period to each of the plurality of user devices having access to the storage account by using the password; and upon expiration of the predetermined storage time period:
disabling the storage account; and
deleting the data items, the name associated with the storage account, and the password associated with the storage account, wherein the request is received from a requester device of the plurality of user devices, wherein the name of the storage account corresponds to an event name, wherein the event name is determined according to a calendar associated with a user of the requester device, wherein the geographic area is based on a distance from a location of the requester device, wherein the geographic area is updated according to movements of the requester device thereby resulting in a dynamically updated geographic area, wherein the dynamically updated geographic area results in a first device of the plurality of user devices previously outside the geographic area being able to access the storage account upon transitioning into the dynamically updated geographic area, and wherein the dynamically updated geographic area results in a second device of the plurality of user devices previously inside the geographic area being unable to access the storage account upon transitioning out of the dynamically updated geographic area.

12. The device of claim 11, wherein the distance from the location of the requester device is a radial distance, and wherein the geographic area is based on the radial distance from the location of the requester device.

13. The device of claim 11, wherein the event name corresponds to an identifier of a venue, and wherein the geographic area is initiated at the venue.

14. The device of claim 11, wherein a single message comprising a selected portion of the data items is transmitted to a user device of the plurality of user devices responsive to a command from the user device.

15. The device of claim 11, wherein the request specifies the predetermined uploading time period and the predetermined downloading time period.

16. A non-transitory, machine-readable storage medium, comprising executable instructions that, when executed by a processing system including a processor, facilitate performance of operations comprising:

receiving a request for storage accessible to a plurality of user devices, wherein a plurality of device users associated with the plurality of user devices subscribe to a service provided by the processing system, each of the plurality of device users having a personal credential for accessing the service;

initiating, in response to the request, a storage account having associated therewith a name, a password, a predetermined uploading time period, a predetermined downloading time period that differs from the predetermined uploading time period, and a predetermined storage time period;

storing, during the predetermined storage time period, data items transmitted during the predetermined uploading time period by user devices having access to the storage account without the personal credential, wherein the plurality of user devices access the storage account by using the password, wherein the password is distinct from the personal credential, is shared by the plurality of device users, and is used only to access the storage account, wherein the plurality of user devices access the storage account only when located within a geographic area defined in the request, and wherein any of the data items is available during the predetermined downloading time period to each of the plurality of user devices having access to the storage account by using the password; and upon expiration of the predetermined storage time period:
disabling the storage account; and
deleting the data items and the password, wherein the request is received from a requester device of the plurality of user devices, wherein the name of the storage account corresponds to an event name, wherein the event name is determined according to a location of the requester device, wherein the geographic area is based on a radial distance from the location of the requester device, wherein the geographic area is updated according to a change in a location coordinate of the requester device thereby resulting in a dynamically updated geographic area, wherein the dynamically updated geographic area results in a first device of the plurality of user devices previously outside the geographic area being able to access the storage account upon transitioning into the dynamically updated geographic area, wherein the dynamically updated geographic area results in a second device of the plurality of user devices previously inside the geographic area being unable to access the storage account upon transitioning out of the dynamically updated geographic area, and wherein a single message comprising at least a selected portion of the data items is transmitted to one of the plurality of user devices responsive to a command from that user device.

17. The non-transitory, machine-readable storage medium of claim 16, wherein the storage account is anonymously shared with the plurality of device users.

18. The non-transitory, machine-readable storage medium of claim 16, wherein the predetermined storage time period is specified in the request.

19. The non-transitory, machine-readable storage medium of claim 18, wherein the request specifies the predetermined uploading time period and the predetermined downloading time period.

20. The non-transitory, machine-readable storage medium of claim 16, wherein the operations further comprise:
- receiving the password from the requester device; and
- determining the location of the requester device.

* * * * *